UNITED STATES PATENT OFFICE.

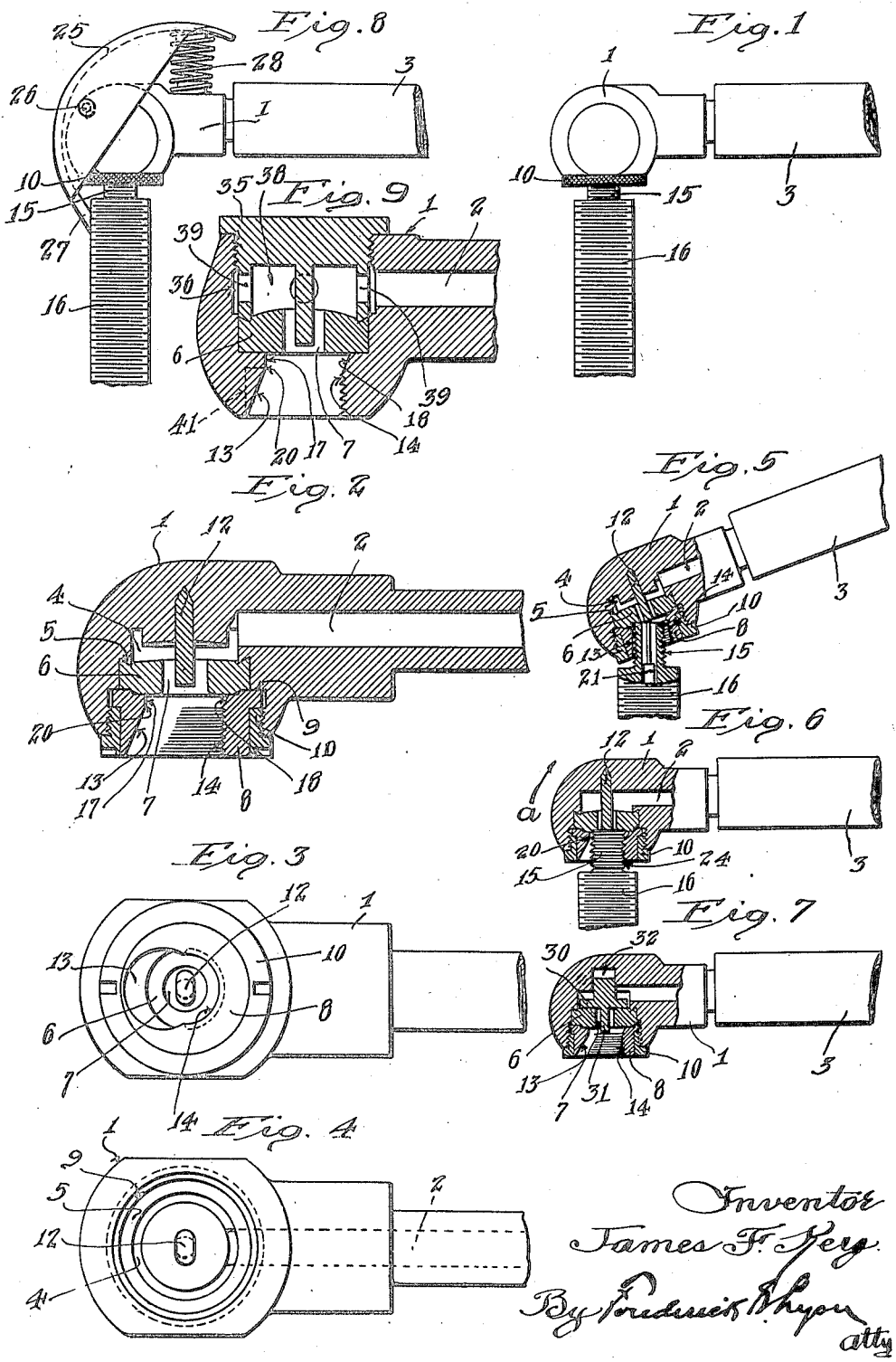

JAMES F. KEY, OF SIERRA MADRE, CALIFORNIA, ASSIGNOR OF ONE-HALF TO WILLIAM A. HAYT, OF LOS ANGELES, CALIFORNIA.

COUPLING.

1,385,080. Specification of Letters Patent. Patented July 19, 1921.

Application filed May 24, 1920. Serial No. 383,931.

*To all whom it may concern:*

Be it known that I, JAMES F. KEY, a citizen of the United States, residing at Sierra Madre, in the county of Los Angeles and State of California, have invented a new and useful Coupling, of which the following is a specification.

This invention relates to couplings and is more particularly directed to a terminal air hose coupling adapted to be engaged with the valve stem of an automobile tire preparatory to the inflation of the tire.

The object of the invention is to provide a coupling slidably engaging over the tire valve stem and subsequently tilted to a locking position.

Another object is to provide a coupling in which the air pressure maintains the coupling in engagement with the valve stem.

Another object is to provide a coupling which engages over the threaded end of a tire valve stem and is then tilted to engage a threaded portion of the coupling with one side of the threaded stem.

Another object is to provide means for maintaining the coupling against accidental disengagement from the valve stem.

A further object is to provide a coupling of the above type with a valve for controlling the air port therein.

Various other objects and advantages will be more fully apparent from the following description of the accompanying drawings which form a part of this disclosure, and which illustrate a preferred form of embodiment of the invention.

Of the drawings:

Figure 1 is a side elevation of the device applied to a tire valve stem.

Fig. 2 is an enlarged longitudinal section.

Fig. 3 is a bottom plan view of Fig. 2.

Fig. 4 is a similar bottom plan view, with the detachable parts removed.

Fig. 5 is a longitudinal section illustrating the first step in applying the device to a tire valve stem.

Fig. 6 is a similar section illustrating the final step in such application.

Fig. 7 is a longitudinal section showing the device in a form having a valve in the coupling.

Fig. 8 is a side elevation of a form of the device which is provided with a retaining clip.

Fig. 9 is a longitudinal section of a coupling made with the throat opening cut directly in the coupling body.

Referring particularly to Figs. 1 to 6 of the drawings, 1 designates a body having a longitudinal air passage 2 communicating with an air hose 3, said air hose engaging over the end of the body and attached thereto by any suitable means. The body has a circular recess providing an air chamber 4 and formed to provide an annular seat 5 for engagement by a rubber ring or washer 6 having a medial air port 7. A bushing 8, which is the means by which the coupling is attached to the tire valve stem, seats against an annular shoulder 9 formed on the body and engages over the washer 6 compressing the peripheral portion of said washer on its seat 5 to retain the washer in place, the bushing 8 being engaged and forced tightly against the shoulder 9, by a threaded bushing 10 surrounding the bushing 8 and having a screw-threaded engagement in the bore of the body. A stud 12 secured in a bore in the body, as by a drive fit or otherwise, extends through the chamber 4 and extends nearly flush with the outer surface of the washer 6.

It will be noted that the yielding washer or gasket 6 is secured in fixed position and that the seat 5 engages only the peripheral portion thereof leaving the entire medial portion of the gasket free to be flexed inwardly. This inward flexing of the gasket is essential to the successful functioning of the coupling as it performs the function of initially retaining the coupling in place on a tire valve stem before the compressed air is entrained through the coupling to inflate the tire, as will later be described.

The bore of the bushing 8 is cut away on the outer side in alinement with the longitudinal center of the coupling to form the angled circular wall 13 (see Fig. 2), the opposite wall being threaded as indicated at 14, the threaded portion being of a size and the threads being of the proper pitch to correctly register with the threaded upper portion 15 of the tire valve stem 16. With reference to Fig. 3 it will be seen that the circular wall 13 extends to a diameter equal to the bottom of the threads of the opposite wall, also that the wall 13 terminates with a straight portion 17 adjacent the washer 6 and that at the base of the threaded portion 14, the opposite wall is relieved as at 18.

This structure provides a bushing having a throat or bore for receiving the tire valve stem and which is provided with a threaded portion disposed in axial alinement with the washer 6 and air port 7 and an angled smooth portion angled relative to the threaded portion and terminating with a straight abutment portion 17 as a retaining means, the threaded portion being relieved at a point adjacent the washer 6.

In use, the coupling is tilted as shown in Fig. 5 and engaged over the end of the tire valve stem, the valve stem engaging the angled wall 13 without engaging the threaded portion 14 on the opposite side of the throat. In this first step in applying the coupling to the tire valve stem, the coupling is pressed thereon with sufficient force to engage the rubber washer 6 on the top of said valve stem and flex its medial portion inwardly. To prevent the valve stem being forced through the port 7 in the washer 6, the outer end of the stud 12, as indicated at 40 in Figs. 3, 4, is made wide enough in one direction to engage the end of the valve stem and limit the movement of the body toward the tire valve stem. The coupling is then tilted to a straight horizontal position as shown in Fig. 6. In this movement the coupling fulcrums on the point 20 of the angled wall 13, the threaded wall 14 swinging into engagement with the adjacent side of the threaded end of the tire valve stem and the inner end of the other side of said threaded end engaging the straight portion 17 of the smooth wall as an abutment which, as long as the coupling is retained in straight position will retain the threads of the coupling bushing in engagement with the threads of the tire valve stem. The relief at 18 is provided as clearance for the end threads of the valve stem during this tilting of the coupling to the straight position.

When the coupling is thus applied the inherent tension of the washer 6 tends to urge it to its normal flat position and this outward elasticity functions to maintain the mutilated threads of the throat wall in engagement with the valve stem while the coupling is in horizontal position and before air under pressure is entrained through the coupling.

When turned to the straight position the stud 12 will engage and unseat the air valve 21 of the tire valve stem in a manner now well understood in the art pertaining to tires and tire valves.

It will be understood from the above description that the inherent elasticity of the gasket will initially maintain the coupling on the valve stem and that the weight of the overhanging end of the coupling coupled with the weight of the air hose will serve to prevent a tilting upward of the coupling to a releasing position and that so long as the effect of this overhanging weight is not destroyed by lifting up the air hose, the coupling will automatically be retained on the tire valve stem.

With the coupling applied to the tire valve stem the compressed air is turned into the air hose 3 to inflate the tire, and the air in the chamber 4, acting upon the inner surface of the rubber washer 6, will cause said washer to press with great force against the tire valve stem in a straight axial direction. This pressure will serve to more firmly lock the coupling on the valve stem, for the reason that, with the pressure equally distributed, the pull of the coupling on the stem is directly axial and as the threaded engagement of the coupling with one side of the stem prevents movement of the coupling on the one side the tendency of the coupling would be to rock in the direction of the arrow $a$ in Fig. 6, using the point 24 as a fulcrum. This tendency would cause the straight abutment portion 17 of the smooth wall to abut against the threaded valve stem and thereby firmly lock the coupling on the stem. Therefore, it will be evident that the greater the pressure of the air in the air chamber 4, the tighter will the coupling be locked on the tire valve stem.

As a means of amplifying the description of this locking function, let it be supposed that with an ordinary piston being forced through a cylinder, the piston contacted with an abutment or an obstruction on one side of the piston wall. This would cause the piston to tilt so that the opposite side of the piston would impinge against the opposite side of the cylinder wall and force the piston into tighter engagement with the obstruction or abutment. In the present instance the air pressure acting on the under surface of the washer 6 exerts a force tending to propel the tire valve stem out of the throat of the coupling and the valve stem is held on the one side by the threaded wall portion 14, causing the coupling to tilt and the opposite side of the valve stem to impinge against the abutment wall 17 to force a tighter engagement of the threaded wall 14 with the valve stem.

It will here be noted that the provision of the smooth angled wall 13 is for the purpose of guiding the coupling over the valve stem, otherwise, it is only formed to provide relief so that the coupling may engage over the tire valve stem while in an angled position, and may, as far as the functioning of the device is concerned, be abruptly cut away as indicated at 41 in Fig. 9, leaving only the straight abutment wall 17.

To disengage the coupling the air hose is forced or jerked quickly upward to tilt the coupling to the position shown in Fig. 5, when the air pressure will then assist in the removal of the coupling.

If desired an additional provision may be provided for retaining the coupling on the tire valve stem, one form of such additional means being shown in Fig. 8, and which comprises a manually operated clip 25 which is pivoted on the body at 26 and is provided with a nose 27 having a flat surface engaging the valve stem. A spring 28 interposed between the body and the opposite end of said clip exerts its tension to urge the threaded portion of the throat bushing 8 of the coupling into engagement with the threaded end of the tire valve stem and to prevent an accidental tilting of the coupling.

A modified method of manufacturing the coupling is illustrated in Fig. 9. This method consists of forming the receiving throat directly in the body of the coupling and providing a plug 35 which is screw-threaded into an opposite bore in the body to clamp the washer 6 in place. The plug has the stud 12 formed integral therewith and the threaded bore is relieved at 36 to form an annular chamber communicating with the air passage 2 of the body. The plug incloses the air chamber 38 which corresponds to the chamber 4 before described, and the wall of the plug is provided with transverse ports 39 communicating with the annular chamber 38.

In some instances it is desirable to continuously maintain air under pressure in the air hose 3, and in this event the coupling will be provided with a valve 30, as shown in Fig. 7, engaging the inner surface of the rubber washer 6 and having a stud 31 to open the tire valve 21. In this case the fixed stud 12 is eliminated and the valve 30 is guided in a recess 32 in the body 1.

While I have shown the threaded wall 14 as extending approximately half way around the receiving throat it will be stated that the threads may, if desired, be of short circular length, and that with threads of short length it would be possible, instead of forming them as screw-threads they could be formed as straight teeth having no circular angularity.

It is, therefore, to be understood that the broad scope of the invention includes a throat having a wall having threads, teeth or serrations adapted to engage the screw-threads of the valve stem and also that only one of such threads, teeth or serrations may be provided although I preferably provide more than one as a matter of safety, more positive functioning of the device, and durability.

I claim:

1. In an air hose coupling adapted for connection with a tire valve stem, a throat provided with an abutment and an opposed threaded wall, and an elastic washer for automatically binding the coupling against the stem.

2. A device of the class described combining, a body having an air passage terminating with a receiving throat elongated in one direction and having an opposite threaded wall, and a stationary yielding apertured member defining the base of the throat and positioned across said passage, said member being secured only at its outer peripheral portion with its medial portion free to be flexed inwardly.

3. A device of the class described combining, a body having an air passage terminating with a receiving throat elongated in one direction and having an opposite threaded wall, and a stationary yielding apertured member defining the base of the throat and positioned across said passage, said member being secured only at its outer peripheral portion with its medial portion free to be flexed inwardly, the throat being substantially circular at its base and providing an abutment wall opposite the threaded wall with the connecting side walls smooth and spaced to allow free engagement of the body over a tire valve stem with the body in tilted position.

4. A device of the class described combining, a body having an air passage terminating with a receiving throat elongated in one direction to provide an angled smooth wall terminating with a straight abutment wall at the base of the throat and an opposite serrated wall, and a stationary yielding apertured member defining the base of the throat and positioned across the air passage, said member being secured only at its outer peripheral portion with its medial portion free to be flexed inwardly.

5. A device of the class described combining, a body having an air passage terminating with a receiving throat providing opposed parallel smooth wall portions, an intermediate threaded wall portion and an opposite intermediate abutment wall, the outer portion of the abutment wall being cut away to permit an angled engagement of the body over a tire valve stem, and a stationary yielding apertured member defining the base of the throat and adapted to exert an outward thrust on the tire valve stem to automatically bind the coupling against the stem.

6. A device of the class described combining, a body having an air passage terminating with a receiving throat adapted to engage over a threaded tire valve stem, and a stationary yielding apertured member defining the base of the throat and positioned across the air passage, said member being secured only at its outer peripheral portion with its medial portion free to be flexed inwardly, the throat being elongated in one direction and formed to provide an abutment wall adjacent the yielding member on the side of the elongation of the throat and an opposed serrated wall extended beyond the abutment wall, the connecting walls being smooth and relatively spaced to provide a free engagement of the body over the valve stem when the body is tilted.

7. A device of the class described combining, a body having an air passage formed to provide an annular seat and a threaded bore, a stationary yielding apertured member engaging the seat with its medial portion free to be flexed inwardly, a bushing maintaining the outer peripheral portion of the yielding member on the seat and having a throat adapted to be engaged over the tire valve stem, and a second screw-threaded bushing engaged into the threaded bore and surrounding the first named bushing to maintain it in clamping engagement with the yielding member, the throat having an abutment wall, an opposed serrated wall extended beyond the abutment wall, and smooth connecting walls.

8. A device of the class described combining, a body having an air passage terminating with a receiving throat elongated in one direction and having an opposite threaded wall, a stationary yielding apertured member defining the base of the throat and positioned across said passage, said member being secured only at its outer peripheral portion with its medial portion free to be flexed inwardly, and a stationary stud axially alined with and extended into the aperture of the yielding member, said stud being smaller than the aperture and adapted to unseat a tire valve.

9. A device of the class described combining, a body having an air passage terminating with a throat providing an abutment wall, an opposed serrated wall extended beyond the abutment wall, and connecting walls spaced to permit free engagement of the body on a tire valve stem when the body is tilted, a stationary yielding member extending across the passage at the base of the throat and having a medial port establishing communication between the passage and throat, said member being secured only at its outer peripheral portion with its medial portion free to be flexed inwardly, and a valve in the passage engaging the inner surface of the yielding member and having a projection extending into the port to engage the tire valve to unseat the tire valve and to unseat the valve in the air passage.

Signed at Los Angeles, California, this 1st day of May, 1920.

JAMES F. KEY.

Witnesses:
CLARENCE B. FOSTER,
L. BELLE WEAVER.